Dec. 19, 1939.   R. E. LEHMAN   2,183,773
REMOVABLE SPOUT STRAINER
Filed March 5, 1938
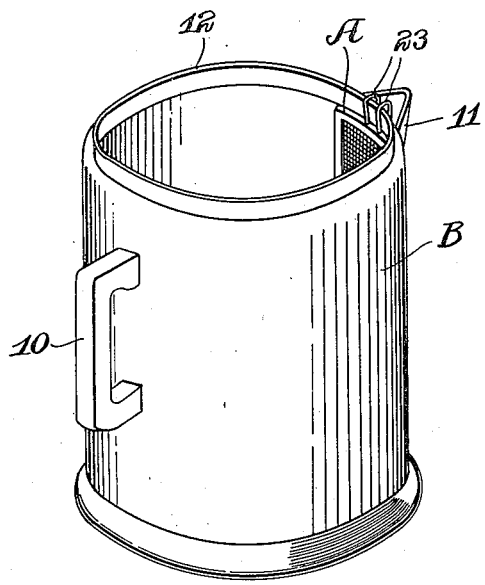
Fig. 1
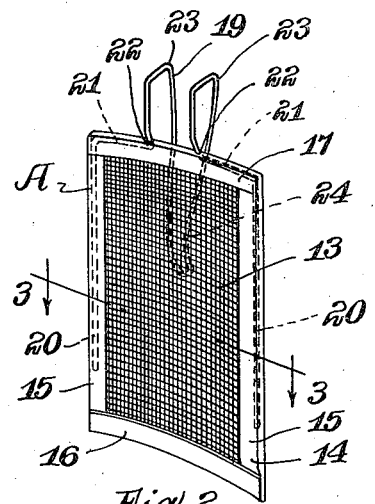
Fig. 2
Fig. 3
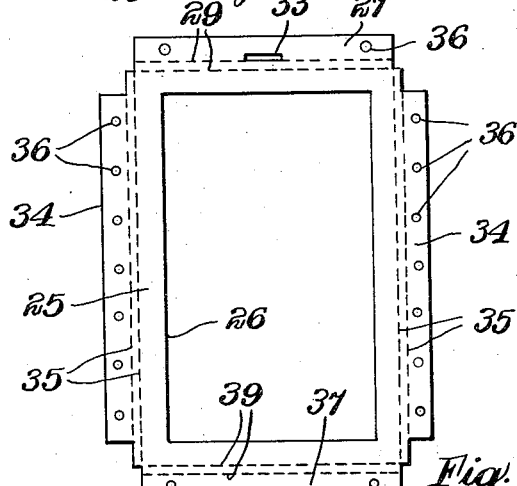
Fig. 4
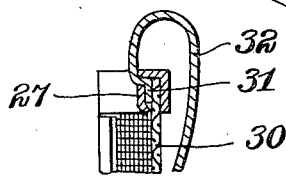
Fig. 6
Fig. 5
Inventor
Robert E. Lehman
By
Attorney Patented Dec. 19, 1939

2,183,773

UNITED STATES PATENT OFFICE 2,183,773

REMOVABLE SPOUT STRAINER

Robert E. Lehman, St. Paul, Minn.

Application March 5, 1938, Serial No. 194,093

3 Claims. (Cl. 210—162)

My invention relates to an improvement in a removable spout strainer wherein it is desired to provide a strainer which may be used to cover the opening of a spout or the like to strain the material passing into the spout.

Coffee pots and the like are ordinarily provided with spouts which extend from one side of the pot near the top thereof. In the usual formation of a coffee pot or the like the spout is attached on the outer surface of the receptacle and openings are formed through the wall of the receptacle communicating with this spout. The provision of such openings provide a straining action in that they prevent any large objects from passing into the spout. However, the openings cannot be sufficiently small to prevent the entry of grounds of the coffee into the spout as such openings through the wall of the receptacle would not usually provide the desired flow. Furthermore, if the holes were formed directly in the wall of the container, they would be likely to become plugged up and could not be easily cleaned.

It is the purpose of the present invention to provide a screen particularly designed for overlying the inside wall of the container over the openings to the spout. With such a construction, all of the liquid passing into the spout must pass through a fine mesh screen forming a part of my strainer. Accordingly, all of the liquid passing through the spout is thoroughly and effectively strained.

It is a purpose of my invention to provide a strainer which is detachably secured in place by means of a spring clip which tends to hold the screen resiliently against the inner wall of the container. In actual practice it will be found that the weight of the liquid when the strainer is being used tends to even more effectively hold the strainer against the inner wall of the container.

In preferable form, the resilient supporting hook extends over the upper edge of the coffee pot and extends into the spout of the same. This construction enables the strainer to be easily applied and properly positioned in place without requiring care to ascertain that the screen is in proper position.

It is the purpose of my invention to provide a strainer which is embodied directly in the coffee pot and which effectively strains the liquid being poured from the coffee pot without requiring separate handling. In other words, the present construction forms a part of the coffee pot itself during use and does not need to be held in place while being used. Accordingly, my construction obviates the necessity of separate strainers of the usual type through which coffee may be poured. These former types of strainers have the obvious disadvantage of dripping after being used and are therefore much more difficult to handle.

It is a further feature of my invention to provide a strainer which is shaped to fit the inner wall of the coffee pot and yet which is sufficiently flat to permit easy cleaning of the same. The strainer may be usually readily cleaned by merely passing water from the faucet therethrough in a reversed direction but both surfaces of the screen are readily available if cleaning by means of a brush or other implement is desired.

These and other features and novel objects of my invention will be more clearly and fully set forth in the following specification and claims.

In the drawing forming a part of my specification:

Figure 1 is a perspective view of a coffee pot illustrating my strainer in position therein.

Figure 2 is a perspective view of my strainer removed from a coffee pot.

Figure 3 is a cross-sectional view through my strainer taken on the line 3—3 of Figure 2.

Figure 4 is a perspective view of a slightly different form of construction of strainer.

Figure 5 is a view of the frame of the strainer illustrated in Figure 4 before the same is folded.

Figure 6 is a detail section showing the spring attaching means for my strainer.

The strainer A is designed for use in the coffee pot B or other suitable receptacle. While I described my strainer as being particularly adapted for use in coffee pots, it will be understood that the strainer may be used for any desired purpose or on any receptacle having a pouring spout thereupon.

The coffee pot B includes a handle 10 and a spout 11. The spout 11 is positioned near the open top 12. The top 12 is usually provided with a suitable closing means not illustrated in the drawing.

The strainer A comprises a rectangular fine mesh screen 13 having a frame 14 of any suitable material extending about the same. The frame 14 is preferably channel-shaped in cross section with the open side of the channel positioned to accommodate the edge of the screen 13. In the construction illustrated in Figure 2, the frame 14 is formed in four separate parts including two side members 15, a bottom member 16, and a top member 17. The frame members 15, 16, and 17 are secured together in any suitable way, such as soldering or crimping to hold the parts in proper relationship.

The supporting clip 19 is formed substantially as illustrated in Figure 2 of the drawing. The clip 19 is formed of a single wire member, the ends 20 of which are folded within channels 15 forming the side members of the frame 14. The ends 20 are provided with offset portions 21 which are enclosed within the top channel frame member 17 and which extend through openings 22 therein. The wire 19 extends upwardly to form a pair of spaced loops 23 extending substantially above the top frame member 17. These loops 23 are connected in a centrally downwardly extending loop 24 which is bent backwardly adjacent the outer surface of the screen 13.

In use the screen is attached to the coffee pot B by extending the loop 24 down into the spout 11 of the coffee pot, the loops 23 extending over the top rim 12 of the same.

The manner in which the screen 13 is held in place by the frame 14 may be seen in Figure 3 of the drawing. The top and bottom frame members 16 and 17 are arcuated in shape so that the screen 13 fits closely against the inside wall of the pot or receptacle B. The frame 14 extends against the inside wall and liquid passing through the spout 11 must pass through the screen 13 in coming from the receptacle.

In Figures 4, 5, and 6 of the drawing I disclose a slightly different form of construction in which the frame of the same is stamped from a single sheet of metal. As it is not necessary to form the entire frame of resilient material, it is believed preferable to form the spring clip in a separate piece and attach the same to the frame in the manner illustrated in Figures 4 and 6 of the drawing or in any other suitable manner. In this type of construction, the strainer C is equipped with a frame 25 having a rectangular opening 26 therein. Top cross members 27 fold along lines 29 and enclose the top of the screen element 30 in place. The cross member 27 as illustrated in Figure 6 of the drawing also encloses the base or anchoring member 31 of the spring clip 32. This clip 32 extends through a hole 33 in the cross member 27 and when the cross member 27 is folded down over this anchoring portion 31 and over the upper edge of the screen 30, the screen is securely locked in position.

Side members 34 are folded along lines 35 forming channels which engage the side edges of the screen 30. The members 34 are folded with sufficient power to frictionally engage the marginal edges of this screen. If it is desired projections 36 may be pressed into the sides, top and bottom to engage into the marginal edge of the screen 30.

The bottom 37 is adapted to fold along lines 39 parallel the lower edge of the opening 26. When the portion 37 is folded along the lines 39 the frame is formed into a channel shape to enclose the lowermost edge of the screen 30.

If it is desired, the screen 30 may be held in place by providing aligned openings in the frame and the screen 30 and providing rivets or other suitable means extending through both sides of the frame and through the screen. It is also possible to hold the clip 32 in position in the upper portion of the frame by extending rivets through the upper extremity of the frame and through the anchoring portion 31 thereof. The clip 32 extends substantially above the top of the frame 25 and forms an upwardly extending loop. The free end 40 of the clip 32 extends in close proximity to the outer surface of the screen 30 and resiliently resists being sprung outwardly. Thus this clip 32 tends to hold the screen 30 against the inner wall of a receptacle under spring tension of the clip.

In accordance with the patent statutes I have described the principles of construction and operation of my removable spout screen, and while I have endeavored to set forth the best embodiment thereof, I desire to have it understood that this is only illustrative of a means of carrying out my invention and that obvious changes may be made within the scope of the following claims without departing from the spirit of my invention.

I claim:

1. A strainer comprising an arcuated screen, a channel-shaped frame marginally enclosing said screen, and supporting clip means partially enclosed by said frame and extending therefrom to provide a resilient supporting means.

2. A strainer comprising a substantially rectangular frame channel-shaped in cross section, an arcuated screen marginally enclosed within said channel-shaped frame, and wire clip means having ends enclosed within the side of said frame and projecting from the top thereof to provide a pair of spaced loops, said loops being centrally connected in a downwardly extending loop to provide a spring clip.

3. A strainer comprising a substantially rectangular frame channel-shaped, a screen enclosed within said frame, a spring clip for said frame, said spring clip including an anchoring member enclosed within a portion of said channel-shaped frame, and extending therefrom to provide a resilient support.

ROBERT E. LEHMAN.